United States Patent Office 3,444,111
Patented May 13, 1969

3,444,111
THERMOSET RESINS FROM AN EPOXY ALCOHOL,
A POLYEPOXIDE AND CYCLIC ANHYDRIDES
Richard A. Hickner, Midland, Mich., assignor to The Dow
Chemical Company, Midland, Mich., a corporation of
Delaware
No Drawing. Continuation-in-part of application Ser. No.
320,861, Nov. 1, 1963. This application Apr. 12, 1967,
Ser. No. 630,197
Int. Cl. C08g 30/12, 30/02
U.S. Cl. 260—18                                    10 Claims

ABSTRACT OF THE DISCLOSURE

Thermosettable resin compositions having increased gel rates and a low viscosity are prepared from epoxy alcohols, polyepoxide resins and cyclic polycarboxylic acid anhydrides. In contrast to the monoglycidyl ether diluents commonly used with epoxy resins, the difunctional epoxy alcohols can be added in substantial proportions without significantly decreasing the heat distortion temperature and without the severe darkening usually encountered in the cured resin.

This is a continuation-in-part of my prior filed application Ser. No. 320,861, filed Nov. 1, 1963, now abandoned.

This invention relates to thermosettable resins containing epoxy alcohols, polyepoxides and cyclic polycarboxylic acid anhydrides having an increased gel rate and a low viscosity. More particularly it relates to resins wherein there is no significant decrease in the heat distortion temperature of the cured resin even when substantial proportions of the epoxy alcohol are added to the resin composition.

Many of the epoxy resins such as the diglycidyl ethers of the bisphenols are either a solid or a highly viscous fluid at ambient temperature before they are cured by cross-linking to a thermoset resin. The use of these materials as molding resins, adhesives, films, potting compounds, etc. where non-reactive solvents cannot be used presents a problem. It is common practice in this type of situation to blend the resin with a reactive diluent such as butyl glycidyl ether or phenyl glycidyl ether. These compounds afford a maximum viscosity reduction with a minimum concentration of the diluent. These monofunctional epoxide compounds react with the epoxy resin, becoming a part of the polymer structure with no significant change in polymer volume during the curing operation. Physical properties such as the heat distortion temperature of the cured resin generally are degraded by these reactive diluents. The degradation of properties become more severe as the proportion of the diluent increases. Also some diluents such as styrene oxide are extremely toxic and have a high vapor pressure which increases the possibility that they will be vaporized during the curing cycle.

Certain cyclic polycarboxylic acid anhydrides used to cure epoxy resins are liquid and produce solutions which are easily handled, however they have slow gel times. Amines may be added to the curing mixture to increase the rate of gelation, however these compounds increase the coloration of the polymer and can lead to the degradation of physical properties.

According to my invention, epoxy alcohols may be added to epoxy resin-anhydride mixtures to obtain settable compositions having a low viscosity and an increased rate of gelation without a significant degradation of physical properties. Resins cured in this manner generally have less coloration and higher impact properties without an appreciable decrease in heat distortion temperature.

While the epoxy alcohols of this invention function as diluents when smaller proportions are added to the polyepoxide-anhydride mixture, the epoxy alcohol can actually comprise the major portion of the resin mixture in contrast to the commonly used monoglycidyl ether diluents.

Epoxy alcohols are polyfunctional compounds containing both a hydroxy group and an oxirane group. The aliphatic epoxy alcohols containing no more than about 8 carbon atoms in the molecule generally have a low melting point and are effective solvents for the uncured polyepoxide resins. Epoxy alcohols which may be used in accordance with this invention include glycidol, monoglycidyl ethers of polyhydric alcohols such as ethylene glycol, propylene glycol, butylene glycol and the corresponding polyglycols, the mono- or diglycidyl ether of glycerol, the mono-, di- or tri-glycidyl ether of pentaerythritol, 2,3-epoxy-1-butanol, 2,3-epoxy-1,4-butane diol and 3,4-epoxy-1-butanol. Glycidol is the preferred epoxy alcohol.

Epoxy resins which may be cured in this manner include polyepoxides such as the diglycidyl ethers of bisphenol A as well as the ethers of other bisphenols commonly known as epoxy resins and the epoxy novolac resins. These resins are obtained by reacting epichlorohydrin with a polyhydric phenol in the presence of caustic. Polyhydric phenols used in producing them are resorcinol, catechol, hydroquinone, methyl resorcinol, chlorohydroquinone, phloroglucinol, 1,5-dihydroxy-naphthalene, 4,4'-dihydroxydiphenyl, bis(4-hydroxyphenyl)-methane, 2,2-bis(4-hydroxyphenyl) propane and the novolac resins containing an average from 2 to about 6 phenolic groups joined by methylene groups. I may also use epoxidized aliphatic compounds such as epoxidized soybean oil or other fatty oil, the polyglycol diepoxides, and the diepoxide compounds such as 3,4-epoxy-6-methylcyclohexylmethyl - 3,4 - epoxy - 6 - methylcyclohexanecarboxylate, available commercially as Unox Epoxide 201, prepared from the cycloaliphatic esters of polyhydric compounds as described in U.S. Patent No. 2,745,847. Any of the aromatic epoxides may contain nuclear halogen atoms to provide flame retardation. The epoxy resins are characterized by having more than one oxirane group per molecule.

Any of the cyclic polycarboxylic acid anhydrides commonly used in curing epoxy resins may be employed. Suitable anhydrides include maleic, phthalic, hexahydrophthalic, pyromellitic, the methylated maleic adduct of phthalic anhydride, succinic anhydride and its hydrocarbon substituted derivatives, dichloro maleic anhydride, and the like. Equivalents of anhydride, as used herein, are determined by dividing the molecular weight of the anhydride by the theoretical number of carboxylic acid groups in the molecule (one anhydride group equals two carboxylic acid groups).

The viscosity reduction effected by reactive diluents is illustrated by the results reported in Table I. Samples were prepared containing from 1.0 to 0.3 epoxide equivalent of a diglycidyl ether of bisphenol A having an epoxide equivalent weight of 172–178 and from 0.0 to 0.7 equivalent of glycidol or butyl glycidyl ether. From these results it can be seen that both diluents are effective viscosity reducers.

TABLE I.—VISCOSITY OF EPOXY RESIN MIXTURES

| Equivalents of Epoxy Resin | Diluents | | Viscosity | | Appearance |
|---|---|---|---|---|---|
| | Glycidol | B.G.E.[1] | Gardner | Poise | |
| 1.0 | | | Z-2—Z-3 | 4,000-6,400 | Crystallizes on standing. |
| 0.9 | 0.1 | | Y | 17.6 | Hazy (25 days). |
| 0.9 | | 0.1 | V | 8.8 | 50% crystallized (12 days). |
| 0.8 | 0.2 | | | | Trace precipitated (25 days.) |
| 0.8 | | 0.2 | | | Clear (13 days). |
| 0.7 | 0.3 | | L | 3 | Clear. |
| 0.6 | 0.4 | | F-G | 1.5 | Do. |
| 0.5 | 0.5 | | C-D | 0.85-1.0 | Do. |
| 0.4 | 0.6 | | A | 0.5 | |
| 0.3 | 0.7 | | A5-A | 0.5 | |

[1] Butyl glycidyl ether.

The reaction rates of the resin curing system were evaluated by measuring the gel time. These determinations employed 0.1 epoxide equivalent per 0.16 equivalent of Nadic methyl anhydride (methylated maleic adduct of phthalic anhydride) per 4 drops N,N-dimethylbenzylamine. The same epoxy resin was used as was used previously in obtaining the results recorded in Table I. After mixing glycidol with the resin mixture, a 150 x 12.5 mm. test tube was filled to a depth of about 2½ inches then the tube placed in a bath at 250° F. and a wood stick inserted in the resin. The gel time was taken as the point where resin would not flow off the stick when it was withdrawn. The precision of this measurement was about 2–4 minutes deviation. The results of these tests are reported in Table II.

TABLE II.—GELATION RATE OF EPOXY-GLYCIDOL-ANHYDRIDE SYSTEM

| Equivalents of Epoxy Resin | Equivalents of Glycidol | Gel Time (min.) |
|---|---|---|
| 0.1 | | 29-33 |
| 0.09 | 0.01 | 24 |
| 0.07 | 0.03 | 14 |
| 0.06 | 0.04 | 15 |
| 0.05 | 0.05 | 17 |
| 0.04 | 0.06 | 16 |
| 0.03 | 0.07 | 12-14 |
| 0.09 | [1] 0.01 | 23 |
| 0.08 | [1] 0.02 | 24 |
| 0.09 | [2] 0.01 | 35 |
| 0.08 | [2] 0.02 | [3] 34 |

[1] Monoglycidyl ether of diethylene glycol.
[2] Phenyl glycidyl ether.
[3] Sample cheesy.

Another test was made using an epoxy resin having a similar epoxide equivalent weight of 172–178 in which phenyl glycidyl ether was compared to glycidol. The gel rates were determined as previously described, and the ratio of epoxide equivalents to anhydride equivalents was 1.0/1.6.

| | A | B |
|---|---|---|
| Equiv. of epoxy resin | 0.06 | 0.06 |
| Equiv. of phenyl glycidyl ether | 0.04 | |
| Equiv. of glycidol | | 0.04 |
| Equiv. of nadic methyl anhydride | 0.16 | 0.16 |
| Drops of catalyst | 4 | 4 |
| Gel time (minutes) | 55-60 | 35 |
| Color | ([1]) | ([2]) |

[1] Dark amber.  [2] Very pale yellow.

Samples of the above epoxy resin formulations were poured into a ½ x 2½" aluminum cup and cured for 9½ hours at 300° F. Sample A was very much darker than sample B, and sample A was not thoroughly cured since it was readily indented. In contrast sample B was well cured and a pencil hardness of 2H–3H was readily determined.

A more striking reduction in gel time is observed when the resin system is an epoxidized soybean oil, an anhydride, and 6 drops of N,N-dimethylbenzylamine per 0.1 equivalent epoxide per 0.16 equivalent anhydride. The greater difference in gel times of resins with and without glycidol is seen in the results listed in Table III.

TABLE III.—GELATION RATE OF EPOXIDIZED SOYBEAN OIL RESIN SYSTEMS

| Equivalents of— | | | Gel Time (minutes) |
|---|---|---|---|
| Epoxy | Glycidol | Anyhdride | |
| 0.1 | | [1] 0.16 | Slight increase in viscosity in 385 min. |
| 0.08 | 0.02 | [1] 0.16 | 85. |
| 0.1 | | [2] 0.16 | 260 (approximately). |
| 0.8 | 0.02 | [2] 0.16 | 50. |

[1] Nadic methyl anhydride (NMA).
[2] Hexahydrophthalic anhydride (HHPA).

The samples in Table III were subsequently cured 2 hours at 222° F., 4 hours at 315° F., and 3 hours at 450° F. The samples of resin containing only epoxy and anhydride produced black, soft, friable bars whereas the samples containing glycidol were flexible and had a light yellow color.

Another test was run with an epoxidized soybean oil (Paraplex G–62) to compare glycidol with phenyl glycidyl ether (PGE). The gel test was run as previously described with an epoxide to anhydride ratio of 1:1.6.

| | A | B | C |
|---|---|---|---|
| Equiv. of G-62 | 0.1 | 0.08 | 0.08 |
| Equiv. of HHPA | 0.16 | 0.16 | 0.16 |
| Equiv. of PGE | | 0.02 | |
| Equiv. of glycidol | | | 0.02 |
| Drops of catalyst | 6 | 6 | 6 |
| Gel time (minutes) | >240 | 155 | 70 |

Samples of each of the above were poured into a heat distortion mold and cured for 12 hours at 300° F. While the order of flexibility was A>B>C, when an attempt is made to bend the bar in half bar A tore in numerous places and ruptured into two parts. Bar B immediately began to tear so that rupture was imminent. In contrast, bar C was bent in half about a dozen times without rupture occurring and could be bent in the opposite direction without rupturing. This clearly shows the superiority of glycidol to phenyl glycidyl ether both in respect to gel times and cured properties.

Considerable latitude in the physical properties of the cured resin may be obtained by varying the ratio of the polyepoxide, anhydride and epoxy alcohol. The ratio of total epoxide equivalents to equivalents of anhydride is preferably between about 0.5:1 and 4:1. The proportions of the epoxy alcohol may range from about 5 to about 95 percent of the total epoxide equivalents.

The descriptions of cured resins containing different ratios of epoxide to anhydride are reported in Tables IVa and IVb. In both tables, the equivalents of epoxy listed were combined with 0.5 equivalent of the anhydride listed and 1.0 equivalent of glycidol. The epoxy used in the samples of Table IVa was the diglycidyl ether of tetraethylene glycol and the epoxy of Table IVb was 3,4 - epoxy - 6 - methylcyclohexylmethyl - 3,4 - epoxy-6 - methylcyclohexanecarboxylate. The samples of Table IVa were cured 70 minutes at 250° F. and 20 minutes at 300° F. Those of Table IVb containing phthalic anhydride were cured 1 hour at 300° F. and the one containing maleic anhydride was cured 18 hours at 300° F.

TABLE IVa.—EFFECT OF RATIO OF EPOXIDE/ANHYDRIDE EQUIVALENTS

| Anhydride | Epoxy | Description |
| --- | --- | --- |
| Maleic | 0.25 | Clear, light yellow, flexible. |
| Phthalic | 0.25 | Do. |
| Do | 0.125 | Amber, slightly flexible. |

TABLE IVb.—EFFECT OF RATIO OF EPOXIDE/ANHYDRIDE EQUIVALENTS

| Anhydride | Epoxy | Description |
| --- | --- | --- |
| Maleic | 0.75 | Hard, clear, amber casting. |
| Phthalic | 0.25 | Do. |
| Do | 0.125 | Hard, clear, somewhat brittle. |
| Do | 0.05 | Hard, clear, amber. |

The data in Table IVa and IVb clearly show that good cured properties are obtained even when glycidol comprises the major portion of the resin mixture. The glycidol ranges from about 57 to about 95 percent of the epoxy composition (equivalents basis) without an appreciable change in properties.

The effect of the glycidol on heat distortion temperature is illustrated by the data in Table V. Test bars were prepared from an epoxy resin which was the diglycidyl ether of bisphenol A having an epoxide equivalent weight of 172–178. The samples contained a total of 0.1 equivalent of epoxide in the epoxy resin and glycidol per 0.16 equivalent Nadic methyl anhydride per 4 drops N,N - dimethylbenzylamine. The bars were cured at 220° F. for 22 hours. These data show that only a minor decrease in heat distortion temperature resulted when the resin contained more than 2 equivalents of glycidol per equivalent of epoxy.

TABLE V.—EFFECT OF GLYCIDOL ON HEAT DISTORTION TEMPERATURE

| Equivalents of Epoxy Resin | Equivalents of Glycidol | H.D.T. °C. |
| --- | --- | --- |
| 0.1 | | 103 |
| 0.07 | 0.03 | 102 |
| 0.06 | 0.04 | 98 |
| 0.05 | 0.05 | 98 |
| 0.04 | 0.06 | 94 |
| 0.03 | 0.07 | 94 |

The effects of various diluents on the heat distortion temperature and resin color are reported in Table VI. The epoxy resin used in these tests was the same as that used in the samples of Table V. The mixtures were cured 2 hours at 220° F. then 4 hours at 315° F. and 3 hours at 450° F.

TABLE VI.—EFFECT OF DILUENTS ON H.D.T. AND RESIN COLOR

| Equivalents of Epoxy Resin | Diluent, Equivalents | | | H.D.T. °C. | Gardner Color |
| --- | --- | --- | --- | --- | --- |
| | (a) | (b) | (c) | | |
| 0.10 | | | | Broke | Black |
| 0.09 | 0.01 | | | 105 | 14 |
| 0.08 | 0.02 | | | 98 | 13 |
| 0.09 | | 0.01 | | 50 | Dark borwn |
| 0.08 | | 0.02 | | Broke | Dark brown |
| 0.05 | | | 0.05 | 99 | 16 |
| 0.04 | | | 0.06 | 93 | 17 |
| 0.03 | | | 0.07 | 92.5 | 17–18 |

(a) Monoglycidyl ether of diethylene glycol.
(b) Butyl glycidyl ether.
(c) Glycidol.

The samples containing no diluent and the one containing 0.02 equivalent butyl glycidyl ether were so hard that they broke in the mold during the curing cycle. The other sample containing bnutyl glycidyl ether had a heat distortion temperature of 50° C., which is about 50% less than that for a sample containing 5 times as much glycidol. Only the samples containing glycidol and monoglycidyl ether of diethylene glycol had low color and high heat distortion temperature.

The epoxy novolac resins generally have greater stability at elevated temperatures than other polyepoxides. The data in Table VII show that an epoxy alcohol can be used in combination with an epoxy novolac without a substantial effect on heat distortion temperature (H.D.T.) and Gardner color. These data were obtained with a solid epoxy novolac having an epoxide equivalent weight in the range 175–182 and an approximate viscosity at 25° C. of 19,000,000 cps. The epoxide equivalents of epoxide and glycidol shown were reacted with 1.7 equivalents of Nadic methyl anhydride. The resin was cured with 0.75 gram α - methyl - N,N - dimethylbenzylamine/0.25 equivalent epoxy, the cure being conducted at 300° F. for one hour then at 400° F. for four hours.

TABLE VII.—EFFECTS OF GLYCIDOL ON H.D.T. AND COLOR OF EPOXY NOVOLACS

| Equivalents of Epoxy Resin | Equivalents of Glycidol | H.D.T. °C. | Gardner Color |
| --- | --- | --- | --- |
| 1.0 | | 171 | 18 |
| 0.9 | 0.1 | 163 | 14 |
| 0.8 | 0.2 | 155 | 12 |

Epoxidized polybutadiene is another epoxy resin which may be used in accordance with this invention. Table VIII reports the properties of solutions of this resin in glycidol as well as the properties of the cured resin. The epoxidized polybutadiene used in these resins had an epoxide equivalent weight of about 177 and a viscosity of about 180,000 centipoise at 25° C. The quantities of epoxy and glycidol are expressed as epoxide equivalents. Pencil hardness is a relative value, determined by marking the resin with the points of several drawing pencils and observing the softest pencil which scratches the surface of the resin.

TABLE VIII.—EFFECTS OF GLYCIDOL ON EPOXIDIZED POLYBUTADIENE RESINS

| Equivalents of Epoxy Resins | Equivalents of Glycidol | Gel Time, min. | Pencil Hardness | Gardner Color |
| --- | --- | --- | --- | --- |
| 0.1 | | 73 | 3H | 17 |
| 0.09 | 0.01 | 35 | 4H–6H | 11–12 |
| 0.07 | 0.03 | 25 | 4H–6H | 8–9 |
| 0.05 | 0.05 | 23 | 4H–6H | 7–8 |

These resins were cured by mixing 0.16 equivalent of Nadic methyl anhydride and 4 drops of N,N-dimethylbenzylamine with 0.1 equivalent of the epoxy compounds.

From the foregoing it can be seen that significant improvements in gel time, resin color and heat distortion temperature are realized when epoxy resins are combined with an epoxy alcohol such as glycidol or other compounds containing both a hydroxyl group and an epoxy or oxirane group.

What is claimed is:

1. A thermosetting resin composition having a low viscosity and improved gellation rate which comprises a polyepoxide, wherein the polyepoxide contains more than one oxirane group per molecule; a cyclic polycarboxylic acid anhydride; and an epoxy alcohol, wherein the epoxy alcohol contains from 1 to 8 carbon atoms; and wherein said composition the ratio of total epoxide equivalents to equivalents of anhydride is between about 0.5:1 and about 4:1 and the epoxy alcohol constitutes from about 5 to about 95 percent of the total epoxide equivalents.

2. A resin according to claim 1 wherein the epoxy alcohol is glycidol.

3. A resin according to claim 1 wherein the epoxy alcohol is a monoglycidyl ether of ethylene glycol.

4. A resin according to claim 1 wherein the polyepoxide is a glycidyl polyether of a polyhydric phenol or a polyhydric alcohol.

5. A resin according to claim 1 wherein the polyepoxide is 3,4-epoxy-6-methylcyclohexylmethyl-3,4-epoxy-6-methylcyclohexanecarboxylate.

6. A resin according to claim 1 wherein the polyepoxide is an epoxidized novolac resin having an average number of phenolic groups from 2 to about 6 joined by methylene groups.

7. A resin according to claim 1 wherein the polyepoxide is an epoxidized soybean oil.

8. A resin according to claim 1 wherein the polyepoxide is an epoxidized polybutadiene resin.

9. A resin according to claim 1 wherein the polyepoxide is a nuclear halogenated glycidyl polyether of a polyhydric phenol.

10. A resin having a high heat distortion temperature produced by curing the composition of claim 1.

References Cited

UNITED STATES PATENTS

| | | |
|---|---|---|
| 2,528,932 | 11/1950 | Wiles et al. |
| 2,768,153 | 10/1956 | Shokal. |
| 2,921,923 | 1/1960 | Bruin et al. |
| 2,947,712 | 8/1960 | Belanger et al. |
| 2,947,726 | 8/1960 | Belanger et al. |
| 3,218,288 | 11/1965 | Warburton. |
| 3,301,795 | 1/1967 | Wooster. |

DONALD E. CZAJA, *Primary Examiner.*

R. W. GRIFFIN, *Assistant Examiner.*

U.S. Cl. X.R.

260—2, 47, 57, 78.4, 94.7